US012683750B2

(12) United States Patent
Liu et al.

(10) Patent No.: US 12,683,750 B2
(45) Date of Patent: Jul. 14, 2026

(54) AGGREGATION CONFIGURATION METHOD AND APPARATUS, AND TERMINAL

(71) Applicant: VIVO MOBILE COMMUNICATION CO., LTD., Dongguan (CN)

(72) Inventors: Jiamin Liu, Dongguan (CN); Xiaodong Yang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 535 days.

(21) Appl. No.: 18/119,809

(22) Filed: Mar. 9, 2023

(65) Prior Publication Data

US 2023/0216649 A1     Jul. 6, 2023

Related U.S. Application Data

(63) Continuation of application No. PCT/CN2021/118510, filed on Sep. 15, 2021.

(30) Foreign Application Priority Data

Sep. 21, 2020    (CN) .......................... 202010998257.6

(51) Int. Cl.
| | |
|---|---|
| *H04W 4/00* | (2018.01) |
| *H04L 5/00* | (2006.01) |
| *H04W 28/02* | (2009.01) |
| *H04W 72/25* | (2023.01) |
| *H04W 80/02* | (2009.01) |
| *H04W 84/12* | (2009.01) |

(52) U.S. Cl.
CPC ....... *H04L 5/0094* (2013.01); *H04W 28/0268* (2013.01); *H04W 72/25* (2023.01); *H04W 80/02* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2019/0150214 A1 | 5/2019 | Zhou et al. | |
| 2020/0107312 A1* | 4/2020 | Baghel | H04L 27/2601 |

FOREIGN PATENT DOCUMENTS

| | | | |
|---|---|---|---|
| CN | 106454710 A | 2/2017 | |
| CN | 106538035 A | 3/2017 | |
| WO | 2017193370 A1 | 11/2017 | |
| WO | WO-2022035641 A1 * | 2/2022 | ........... H04W 72/20 |

OTHER PUBLICATIONS

Extended European Search Report issued in related European Application No. 21868649.1, mailed Feb. 15, 2024, 10 pages.
(Continued)

*Primary Examiner* — Zewdu A Beyen
(74) *Attorney, Agent, or Firm* — IPX PLLC

(57) ABSTRACT

An aggregation configuration method and apparatus, and a terminal are provided. The method includes: sending first aggregation configuration information to a second terminal, where the first aggregation configuration information is used for configuring an aggregation operation aggregating a side-link (SL) between the first terminal and the second terminal with another access technology.

17 Claims, 4 Drawing Sheets

(56)             References Cited

OTHER PUBLICATIONS

First Office Action issued in related Chinese Application No. 202010998257.6, mailed Jan. 31, 2024, 6 pages.
International Search Report issued in corresponding International Application No. PCT/CN2021/118510, mailed Nov. 22, 2021, 4 pages.
Nokia Networks, Protocol architecture for WLAN-LTE aggregation, 3GPP TSG-RAN WG2 Meeting #89bis, R2-151071, Apr. 2015, 3 pages.
Ericsson, LTE-WLAN aggregation, 3GPP TSG-RAN WG2 #89bis, Tdoc R2-151438, Apr. 2015, 7 pages.
Second Office Action issued in related Chinese Application No. 202010998257.6, mailed Oct. 18, 2024, 7 pages.
Nokia Networks, "Support for LTE-WLAN Aggregation and Interworking Enhancement" 3GPP tsg_ran\WG3_lu, TSGR3_89, R3-151743, Aug. 2015, 8 pages.
Huawei, HiSilicon, "User plane architecture and associated key aspects for 3GPP/WLAN aggregation", 3GPP tsg_ran\WG2_RL2, TSGR2_89bis, R2-151569, Apr. 2025, 4 pages.

* cited by examiner

Network-side device

Terminal

Terminal

Start

Send first aggregation configuration information to a second terminal, where the first aggregation configuration information is used for configuring an aggregation operation Aggregating a sidelink (SL) between the first terminal and the second terminal with another access technology

201

End 500    501

600    601

AGGREGATION CONFIGURATION METHOD AND APPARATUS, AND TERMINAL

CROSS-REFERENCE TO RELATED APPLICATIONS

This application is a continuation of International Application No. PCT/CN2021/118510, filed Sep. 15, 2021, which claims priority to Chinese Patent Application No. 202010998257.6, filed Sep. 21, 2020. The entire contents of each of the above-referenced applications are expressly incorporated herein by reference.

TECHNICAL FIELD

This application relates to the field of communication technologies, and specifically, to an aggregation configuration method and apparatus, and a terminal.

BACKGROUND

A Long Term Evolution (LTE) system starts to support a Sidelink (SL), and is configured to perform direct data transmission between terminal User Equipment (UE) without going through a network device.

A SG New Radio (NR) system may be used in a working frequency band above 6 GHz that is not supported by LTE, and supports a larger working bandwidth. The NR system supports an interface between a base station and a terminal and an SL interface for direct communication between terminals. The SL interface may also be referred to as a PC5 interface.

In the existing technologies, a Uu interface may support an aggregation operation with a Wireless Local Area Network (WLAN), but the SL interface does not support the aggregation operation with the WLAN. Currently, the SL does not support the aggregation operation with the WLAN, so that there is no related configuration process.

SUMMARY

An objective of embodiments of this application is to provide an aggregation configuration method and apparatus, and a terminal.

According to a first aspect, an embodiment of this application provides an aggregation configuration method, applied to a first terminal, the method including:

sending first aggregation configuration information to a second terminal, where the first aggregation configuration information is used for configuring an aggregation operation of a sidelink SL between the first terminal and the second terminal and another access technology.

According to a second aspect, an embodiment of this application provides an aggregation configuration method, applied to a second terminal, the method including:

receiving first aggregation configuration information sent by a first terminal, where the first aggregation configuration information is used for configuring an aggregation operation of a sidelink SL between the first terminal and the second terminal and another access technology.

According to a third aspect, an aggregation configuration apparatus is provided, applied to a first terminal, the apparatus including:

a first sending module, configured to send first aggregation configuration information to a second terminal, where the first aggregation configuration information is used for configuring an aggregation operation of a sidelink SL between the first terminal and the second terminal and another access technology.

According to a fourth aspect, an aggregation configuration apparatus is provided, applied to a second terminal, the apparatus including:

a first receiving module, configured to receive first aggregation configuration information sent by a first terminal, where the first aggregation configuration information is used for configuring an aggregation operation of a sidelink SL between the first terminal and the second terminal and another access technology.

According to a fifth aspect, a terminal is provided. The terminal includes a processor, a memory, and a program or instruction stored on the memory and executable on the processor, the program or instruction, when executed by the processor, implementing steps of the method according to the first aspect, or implementing steps of the method according to the second aspect.

According to a sixth aspect, a readable storage medium is provided. The readable storage medium stores a program or instruction, the program or instruction, when executed by a processor, implementing steps of the method according to the first aspect, or implementing steps of the method according to the second aspect.

According to a seventh aspect, a chip is provided. The chip includes a processor and a communication interface, where the communication interface is coupled to the processor, and the processor is configured to run a program or instruction of a network-side device, to implement the method according to the first aspect, or implement the method according to the second aspect.

In the embodiments of this application, first aggregation configuration information used for configuring an aggregation operation of a sidelink SL between a first terminal and a second terminal and another access technology is transmitted through a PC5 interface between the first terminal and the second terminal, so that the first terminal and the second terminal can better use the aggregation operation of the SL and the another access technology under control of a network, thereby improving service rates of the terminals, ensuring the quality of service of a terminal service, and ensuring the system efficiency while improving the user experience.

DETAILED DESCRIPTION

The following clearly describes the technical solutions in the embodiments of this application with reference to the accompanying drawings in the embodiments of this application. Apparently, the described embodiments are some embodiments of this application rather than all of the embodiments. All other embodiments obtained by a person of ordinary skill in the art based on the embodiments of this application without creative efforts shall fall within the protection scope of this application.

The specification and claims of this application, and terms "first" and "second" are used to distinguish similar objects, but are unnecessarily used to describe a specific sequence or order. It should be understood that the data in such a way are interchangeable in proper circumstances, so that the embodiments of this application can be implemented in other orders than the order illustrated or described herein. Objects distinguished by "first", "second", and the like are usually one type, and the number of objects is not limited. For example, the first object may be one or more than one. In addition, in the specification and the claims, "and/or" means at least one of the connected objects, and the character "/" generally indicates an "or" relationship between the associated objects.

It should be noted that, the technologies described in the embodiments of this application are not limited to a Long Term Evolution (LTE) system or an LTE-Advanced (LTE-A) system, and can also be used in other wireless communication systems, such as Code Division Multiple Access (CDMA), Time Division Multiple Access (TDMA), Frequency Division Multiple Access (FDMA), Orthogonal Frequency Division Multiple Access (OFDMA), and Single-carrier Frequency-Division Multiple Access (SC-FDMA). The terms "system" and "network" in the embodiments of this application are often used interchangeably, and the described technology can be used not only for the above systems and radio technologies, but also for other systems and radio technologies. However, the following description describes a New Radio (NR) system for example objectives, and NR terms are used in most of the description below, although these technologies are also applicable to applications other than NR system applications, such as a $6^{th}$ Generation (6G) communication system.

Figure 1:
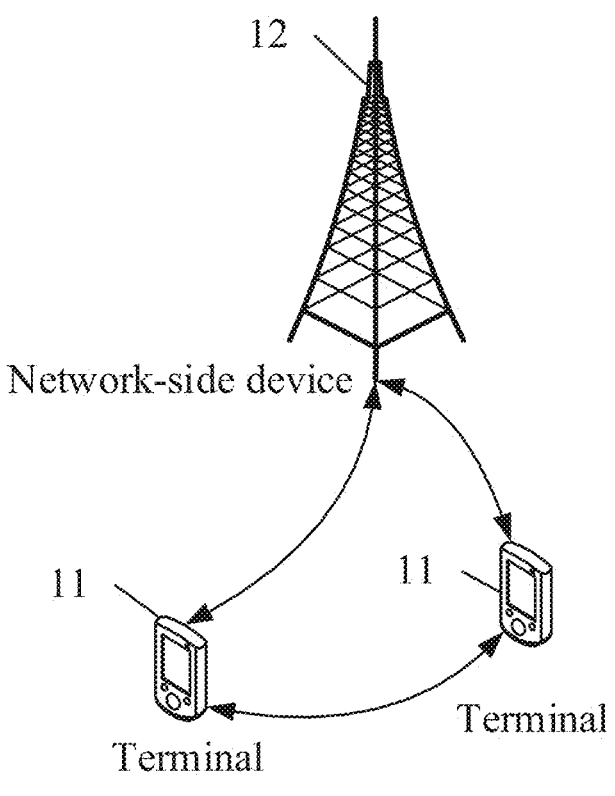
FIG. 1 is a block diagram of a wireless communication system to which the embodiments of this application are applicable.

FIG. 1 is a block diagram of a wireless communication system to which the embodiments of this application are applicable. The wireless communication system includes a terminal 11 and a network-side device 12. The terminal 11 may also be referred to as a terminal device or User Equipment (UE). The terminal 11 may be, for example, a terminal-side device such as a mobile phone, a tablet personal computer, a laptop computer, a Personal Digital Assistant (PDA), a palmtop computer, a netbook, an ultra-mobile personal computer (UMPC), a Mobile Internet Device (MID), a wearable device, an in-vehicle device (VUE), or a pedestrian terminal (PUE). The wearable device includes: a bracelet, earphones, glasses, or the like. It should be noted that, a specific type of the terminal 11 is not limited in the embodiments of this application. The network-side device

12 may be a base station or a core network, where the base station may be referred to as a Node B, an evolved node B, an access point, a Base Transceiver Station (BTS), a radio base station, a radio transceiver, a Basic Service Set (BSS), an Extended Service Set (ESS), a node B, an evolved node B (eNB), a home node B, a home evolved node B, a WLAN access point, a WiFi node, a Transmitting Receiving Point (TRP), or another appropriate term in the field, as long as the same technical effect is achieved. The base station is not limited to a specific technical term. It should be noted that, a base station in the NR system is used as an example in the embodiments of this application, but a specific type of the base station is not limited.

An aggregation configuration method and apparatus, and a terminal provided in the embodiments of this application are described below in detail through specific embodiments and application scenarios thereof with reference to the accompanying drawings.

Figure 2:
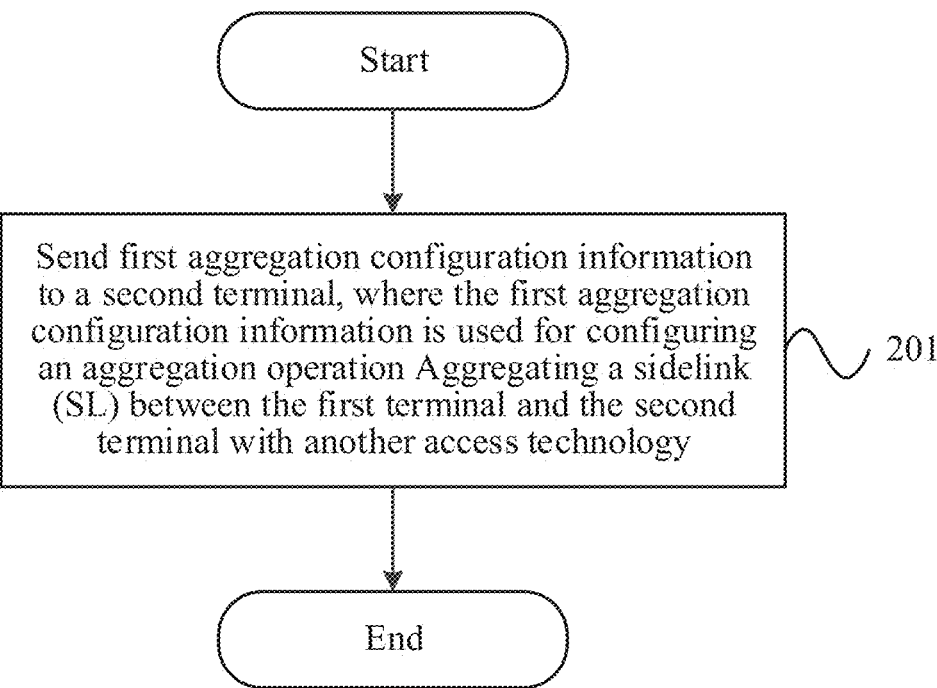
FIG. 2 is a first schematic diagram of steps of an aggregation configuration method according to an embodiment of this application.

As shown in FIG. 2, an embodiment of this application further provides an aggregation configuration method, applied to a first terminal. The method includes the following steps.

Step 201. Send first aggregation configuration information to a second terminal, where the first aggregation configuration information is used for configuring an aggregation operation of a sidelink SL between the first terminal and the second terminal and another access technology.

For example, the first terminal sends the first aggregation configuration information to the second terminal by using a PC5 Radio Resource Control (RRC) message or an another layer message (for example, a Media Access Control (MAC) control element or an L2 control message).

In this embodiment of this application, the another access technology may be a WLAN, behavioral hotspot Wifi, Bluetooth, or the like, which is not specifically limited herein. Correspondingly, an another access technology interface involved in this embodiment of this application is a WLAN interface, a Wifi interface, a Bluetooth interface, or the like. For convenience of description, the another access technology being a WLAN technology is used as an example for description in the following embodiments of this application.

The WLAN interface or the Wifi interface or the Bluetooth interface uses an unlicensed spectrum and shares a bandwidth, so that the fee is low or there is no fee. In addition, a terminal has a WLAN or Wifi interface or a Bluetooth interface as standard, so that there is no additional hardware cost. In addition, an SL interface between terminals supports an aggregation operation with the WLAN. In this way, the transmission efficiency between users can be greatly improved, and route configurations of different services can be performed according to characteristics of the services, thereby improving the user experience on a basis of ensuring the Quality of Service (QoS).

In this embodiment of this application, SL and WLAN aggregation means that, in an existing SL architecture, some data flows need to be offloaded to the WLAN for transmission and unified management and control. An SL and WLAN aggregation architecture includes the following bearer types:

First bearer (may also be referred to as switched WLAN bearer): a bearer that performs transmission completely by WLAN interface and resources, where the bearer may be a user data bearer or a signaling bearer. However, the WLAN is not used for dedicated transmission signaling due to unreliability thereof.

Second bearer (may also be referred to as split WLAN bearer): a bearer that can perform transmission by SL interface and resources and the WLAN interface and resources, where the bearer may be a user data bearer or a signaling bearer.

Third bearer (may also be referred to as SL bearer): a bearer that performs transmission completely by the SL interface and resources, where the bearer may be a user data bearer or a signaling bearer.

Figure 3:
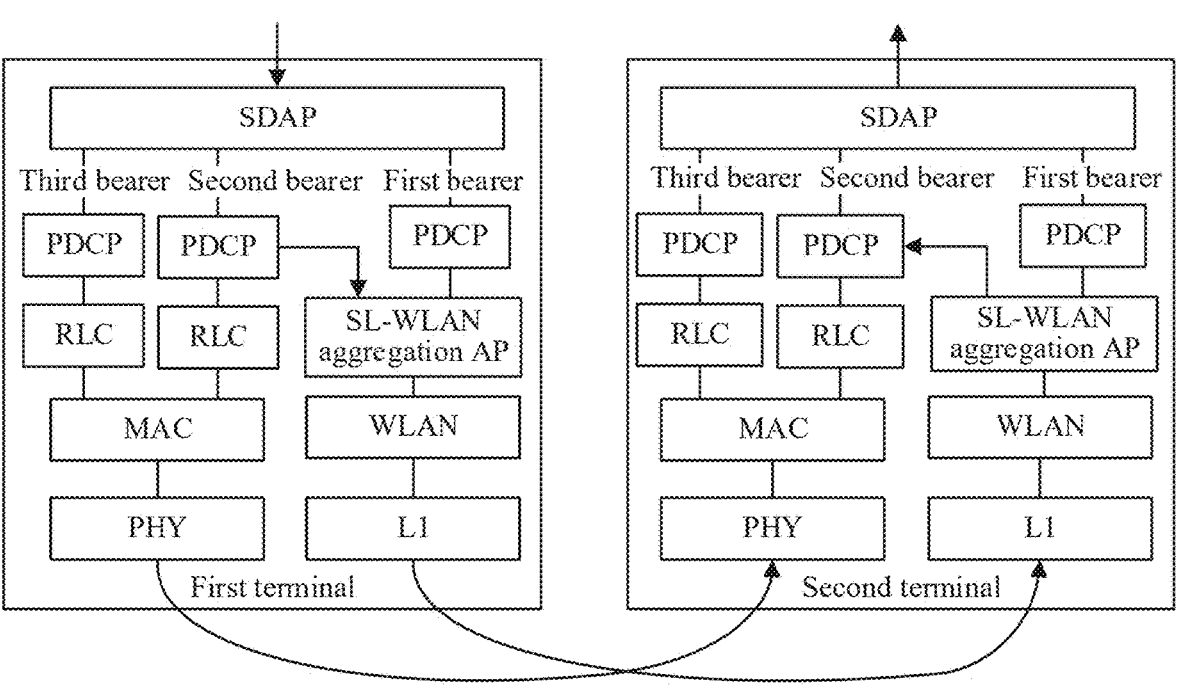
FIG. 3 is a schematic diagram of a protocol stack architecture of a target bearer in an SL and WLAN aggregation architecture.

As shown in FIG. 3, by using uplink data as an example, a schematic diagram of a protocol stack architecture of an SL and WLAN aggregation architecture is provided. As shown in FIG. 3, the third bearer is completely consistent with an existing SL bearer, and can reuse a processing manner of the existing SL bearer. The first bearer and the second bearer are introduced new bearer types because of the SL and WLAN aggregation, and have the following features:

The first bearer performs transmission completely by the WLAN interface and resources. For this type of bearer, an L2 and an L1 thereof comply with a WLAN protocol. However, above the WLAN protocol, due to a need for unified management and control, an SL PDCP layer protocol is required for functions such as header compression, security, and data reordering, and a new SL-WLAN aggregation AP layer needs to be added between a PDCP and a WLAN L2 protocol for distinguishing and identification of bearer identifiers. For example, the AP layer explicitly carries a bearer identifier, so as to identify which PDCP entity the bearer identifier corresponds to (due to a one-to-one correspondence between PDCP entities and RBs).

The second bearer performs transmission by the SL interface and resources and the WLAN interface and resources. This type of bearer has a common PDCP layer, and is divided into two legs under the PDCP layer: one is a traditional SL RLC bearer, which performs transmission by SL RLC/MAC/PHY, and the other is a WLAN bearer, which adds a bearer identifier (RB ID) at the SL-WLAN aggregation AP layer, and then delivers the bearer identifier to a WLAN L2/L1 transmission protocol for transmission.

Because the second bearer may perform transmission by using the resources from the two interfaces, there are two transmission manners. One is to transmit only once, that is, a data packet is either transmitted on an SL link or transmitted on a WLAN link. The other is retransmission, that is, a data packet is copied into two copies, where one is transmitted on the SL link, and the other is transmitted on the WLAN link to improve the reliability.

An underlying mapping relationship, due to the existing SL transmission, uses a layer 2 Destination ID and a layer 2 Source ID to identify a pair of terminals in communication. The two Destination/Source IDs are 24 bits respectively. 16 bits of the Destination ID are carried by a PHY (physical) layer, and the remaining 8 bits are carried by a MAC layer. 8 bits of the Source ID are carried by a PHY layer, and the remaining 16 bits are carried by a MAC layer. In other words, peer terminals in communication may be uniquely determined by PHY+MAC of the SL interface. However, no such mechanism is used for the WLAN link. Therefore, a MAC address of the WLAN link needs to be mapped, that is, in an SL or WLAN signaling process, two terminals exchange to learn WLAN MAC addresses of peer terminals. In this way, the WLAN MAC addresses and the Destination/Source ID can be bound, and the SL link and WLAN link after bonding can perform normal aggregation communication. For example, a terminal 1 and a terminal 2 respectively use a layer 2 ID 1 and a layer 2 ID 2 for SL communication, and in addition, on the WLAN link aggregated with the SL, the terminal 1 uses a MAC address 1, and the terminal 2 uses a MAC address 2. After the terminal 1 and the terminal 2 exchange, a correspondence between the layer 2 IDs and the MAC addresses may be stored. For the terminal 1, aggregation processing may be performed on SL data received from the layer 2 ID 2 (an SL of the terminal 2) and WLAN data received from the MAC address 2 (a WLAN of the terminal 2). For example, in a case of a target bearer, a same PDCP entity entering a same bearer identifier performs a reordering operation, and then delivers the target bearer to an upper layer.

In some embodiments, the first aggregation configuration information includes at least one of the following:

configuration information of a first bearer capable of performing transmission through an another access technology interface;

information about a quality of service QoS flow mapped to the first bearer;

configuration information of a second bearer capable of performing transmission through an SL interface and the another access technology interface;

information about a QoS flow mapped to the second bearer;

information about an interface or a port for data transmission using the another access technology;

configuration information of a third bearer capable of performing transmission through the SL interface;

information about a QoS flow mapped to the third bearer; or information about an another access technology media access control MAC address of the first terminal.

A sending terminal and a receiving terminal perform data transmission and receiving operations according to a configuration. The second bearer may perform transmission by the SL interface and the WLAN interface. The PDCP layer performs reordering and replication operations. The first bearer is the bearer that performs transmission completely by the WLAN interface, and also has an SL PDCP layer protocol stack. It should be noted that, as long as data is transmitted by the WLAN interface, the SL-WLAN aggregation AP layer needs to identify a bearer. That is, an AP layer at which the SL and the another access technology are aggregated carries a bearer identifier for the first bearer or the second bearer through a data packet transmitted by using the another access technology. The bearer identifier is used for assisting in determining a corresponding PDCP entity.

In some embodiments, before step 201, the method further includes:

exchanging terminal capability information with the second terminal, where the terminal capability information is used for indicating whether the aggregation operation of the SL and the another access technology is supported; and correspondingly, step 201 includes:

sending, in a case that both the first terminal and the second terminal support the aggregation operation of the SL and the another access technology, the first aggregation configuration information to the second terminal.

In this embodiment of this application, before an aggregation configuration is performed, the sending terminal and the receiving terminal may carry capability information about whether to support the aggregation operation of the SL and the another access technology in a capability negotiation process. If one party does not support the aggregation operation, the aggregation cannot be configured.

Continuing the above embodiment, in this embodiment of this application, the method further includes:

receiving information about an another access technology MAC address of the second terminal sent by the second terminal.

There is a one-to-one correspondence between links of the SL and the another access technology capable of performing the aggregation operation, where the link of the another access technology is determined by the another access technology MAC address of the first terminal included in the first aggregation configuration information and the another access technology MAC address of the second terminal sent by the second terminal.

For a correspondence between the WLAN and the SL, WLAN MAC addresses of the two terminals are exchanged through PC5 RRC, in other words, there is an aggregation relationship between data received from the notified pair of WLAN MAC addresses and a corresponding SL bearer. For example, if two pieces of PC5 RRC are established between the sending terminal and the receiving terminal, two pairs of WLAN MAC addresses are required to correspond to the two pieces of PC5 RRC in a one-to-one manner. In this way, data of an SL1 and a WLAN address pair 1 can be aggregated, and data of an SL2 and a WLAN address pair 2 can be aggregated, thereby avoiding confusion.

In some embodiments, before step 201, the method further includes:

receiving second aggregation configuration information configured by a network-side device, where the second aggregation configuration information is used for configuring an aggregation operation of an SL and another access technology; and determining the first aggregation configuration information according to the second aggregation configuration information.

Because there are different data types in an SL and WLAN aggregation scenario, according to a feature of a data type, transmission of which bearer type the data type is suitable for needs to be determined, and configuration information related to the bearer also needs to be determined after the bearer type is determined. The determining process is generally related to a series of factors such as a QoS requirement of the service and a network policy, and therefore needs to be determined by a network side. Therefore, in this embodiment of this application, on a premise of supporting the SL and WLAN aggregation, the network side needs to configure specific parameters (namely, second aggregation configuration information) of the aggregation operation for the terminal.

For the network side, a first configuration that needs to be clarified is whether an SL-WLAN aggregation function is supported in this cell. The configuration of whether supported may be configured as follows:

an independent field is used for displaying and indicating whether the function is supported; or whether other configuration information related to the SL-WLAN aggregation occurs is used for representing whether the function is supported. For example, there is a special configuration information field in common configuration signaling or dedicated signaling, which includes the configuration information related to the SL-WLAN aggregation. If the field is configured, it represents that the function is supported, otherwise, it represents that the function is not supported.

On a premise of supporting the function, the network side needs to configure the specific parameters of the aggregation operation for the terminal. Manners of obtaining the second aggregation configuration information according to different states of the terminal may include the following content:

In a case that the first terminal is in an RRC connected state, the first terminal in the connected state reports, through RRC dedicated signaling, a service requirement thereof and even information that may include a situation of the SL/WLAN link to the network side, and the network side provides, according to the specific service requirement, precise aggregation configuration information through the RRC dedicated signaling, where the configuration information may be precisely provided according to a specific service of the terminal, and has strong pertinence.

In some embodiments, in a case that the first terminal is in an idle state or an inactive state, a system information block (SIB) message sent by the network-side device is received. It should be noted that, the first terminal in the connected state may also use the second aggregation configuration information in a SIB. Because overheads of the SIB message need to be considered, the SIB message can only provide the configuration information according to general classification of service types, and cannot provide a precise configuration for a specific service of the terminal.

In some embodiments, in a case that the first terminal is in an offline state, pre-configuration information is obtained. In a case that the first terminal is in the offline state, the terminal cannot obtain real-time aggregation configuration information from the network side. In this case, the pre-configuration information is used to determine the second aggregation configuration information. Similar to the SIB message, the pre-configuration information can only provide the configuration information according to general classification of service types, and cannot provide a precise configuration for a specific service of the terminal.

In some embodiments, the second aggregation configuration information includes at least one of the following:

supporting the aggregation operation of the SL and the another access technology, a characteristic of a service capable of performing transmission using the another access technology;

QoS flow information of the service capable of performing the transmission using the another access technology;

bearer information of the service capable of performing the transmission using the another access technology;

configuration information of another layer corresponding to the service capable of performing the transmission using the another access technology;

a characteristic of a service capable of performing offloading or retransmission using the another access technology;

QoS flow information of the service capable of performing the offloading or retransmission using the another access technology;

bearer information of the service capable of performing the offloading or retransmission using the another access technology;

configuration information of another layer (for example, a Packet Data Convergence Protocol (PDCP) layer or a Service Data Adaptation Protocol (SDAP) layer) corresponding to the service capable of performing the offloading or retransmission using the another access technology;

a characteristic of a service capable of performing SL transmission;

QoS flow information of the service capable of performing the SL transmission;

bearer information of the service capable of performing the SL transmission;

configuration information of another layer corresponding to the service capable of performing the SL transmission; or information about an interface or a port for data transmission using the another access technology.

The above three configuration manners (namely, the SIB message or the RRC signaling or the pre-configuration information) may be summarized in two types. One is that the network side provides common aggregation configuration information, and the first terminal finally determines, according to the common aggregation configuration information, type and corresponding parameters of each bearer with reference to a service, even a link situation, and the like of the first terminal. This type of configuration manner includes SIB and pre-configuration information, and is characterized by obtaining the aggregation configuration information before the service reaches. The other is that the network side provides dedicated aggregation configuration information, and the first terminal reports specific service information and even the link situation. The network side provides precise type and configuration parameters of each bearer according to the specific information. A manner of dedicated signaling is typical.

For the common aggregation configuration information, at least one of the following may be generally included:

Bearer attributes related to the SL-WLAN aggregation generally include: the SL bearer, the SL bearer+the switched WLAN bearer, the SL bearer+the split WLAN bearer, the SL+the split WLAN bearer+the switched WLAN bearer, and other manners. Because the SL is the basis, the SL is necessarily supported when there is no WLAN signal. For example, a signaling design method may use two bits to respectively represent whether a switched WLAN and a split WLAN may be supported, where 0 represents not supported, and 1 represents supported. Therefore, 00 indicates the SL bearer, 10 indicates the SL+the switched WLAN, 01 indicates the SL+the split WLAN, and 11 indicates the SL+the split WLAN+the switched WLAN. In some embodiments, the above four or more possible manners are configured by enumeration. Each enumeration value represents a combination of bearer attributes, and values and corresponding meanings are pre-defined.

An aggregation attribute is configured according to granularity of a QoS flow, for example, whether a specific QoS flow can only be mapped to the SL bearer, or may be mapped to the switched WLAN bearer, or may be mapped to the split WLAN bearer.

The aggregation attribute is configured according to a QoS characteristic. For example, a service that meets a specific QoS requirement, has extremely high block error rate and/or delay requirement (for example, higher than a specific threshold), or has a higher priority (meets a priority threshold) may be configured that the service can only be mapped to the SL bearer. A service with low block error rate and/or delay requirement (for example, less than a specific threshold) may be mapped to the switched WLAN bearer. For a bearer that may be mapped to the split WLAN, a QoS requirement thereof is generally between the two, and there may be a certain overlap between each other, and in an overlapping area, two or more bearer types may be mapped to.

The aggregation attribute is configured according to granularity of a Radio Bearer (RB). That is, different QoS flows are first mapped to different RBs according to QoS or a QoS flow of a service, and it is then further identified in an RB configuration whether an RB can only be mapped to the SL bearer, or may also be mapped to the WLAN split bearer, or even may be mapped to the switched WLAN bearer.

When a QoS flow, a QoS characteristic, or an RB may be mapped to two or more bearers, the network side may further provide a suggested priority order, for example, priorities are sorted in descending or ascending order according to an order in which mapping manners of the bearers appear in configuration signaling. In some embodiments, a priority policy is defaulted, and a high priority represents that a bearer type is preferentially selected. When a condition of a link of the bearer type meets a requirement, the bearer type is preferentially selected. A sub-priority is considered only when the bearer type with the high priority does not met the requirement, and so on.

For a condition of the WLAN link, for example, the split WLAN bearer can be configured only when quality (for example, received signal strength and a channel saturation degree) of the WLAN link meets a specific threshold, or the switched WLAN bearer can be configured only when the quality (for example, the received signal strength and the channel saturation degree) of the WLAN link meets another threshold. The two thresholds may be the same or independent.

For a condition of the SL link, for example, the split WLAN bearer can be configured only when quality (for example, received signal strength and a channel busy situation) of the SL link meets a specific threshold, or the switched WLAN bearer can be configured only when the quality (for example, the received signal strength and the channel busy situation) of the SL link meets another threshold. The two thresholds may be the same or independent.

The condition of the WLAN link and the condition of the SL link may be respectively configured, or may be configured simultaneously. The simultaneous configuration means that WLAN-related bearers can be configured only when the two conditions are met; otherwise, the SL only bearer is configured.

A configuration of the switched WLAN bearer or the split WLAN bearer may be a common configuration, or may be a configuration provided according to aggregation of each RB. An existing SL RB may have, according to a characteristic of a QoS flow mapped to the SL RB, different configurations, for example, PDCP layer parameters, RLC layer parameters, and even MAC parameters. When a bearer is configured as the switched WLAN bearer, the bearer may have different PDCP configurations independent of the SL bearer, where the PDCP configurations may be configured for each RB, that is, each switched WLAN RB has a set of PDCP configurations; or may have a set of common PDCP configurations for all switched WLAN bearers. When a bearer is configured as the split WLAN bearer, the bearer may have different PDCP/RLC/PDCP configurations independent of the SL bearer, where the PDCP/RLC/PDCP configurations may be configured for each RB, that is, each split WLAN bearer has a set of PDCP/RLC/PDCP configurations; or may have a set of common PDCP/RLC/PDCP configurations for all split WLAN bearers. A method of a WLAN specific identifier, such as a data type or label, may also be configured, so that aggregated data is distinguished from common WLAN data.

For the dedicated aggregation configuration, before performing the dedicated configuration, that is, in a case that the first terminal is in an RRC connected state, before the receiving second aggregation configuration information configured by a network-side device, the method further includes:

reporting configuration assistance information to the network-side device, where the configuration assistance information includes at least one of the following:

terminal capability information, where the terminal capability information is used for indicating whether the first terminal supports an aggregation operation of the SL and a WLAN; and only a terminal supporting the aggregation operation can be configured with an aggregation-related bearer;

service information that an SL interface of the first terminal tends to transmit, where detailed service information, for example, information about a QoS flow and QoS configuration information, that the SL interface of the first terminal tends to transmit may be included, so that the network-side device performs a precise aggregation bearer configuration according to the service information;

SL measurement information of the first terminal, which may include a received signal situation of the SL link, for example, Reference Signal Receiving Power (RSRP), or may include a busy situation of a resource pool of the SL link, a Channel Busy Ratio (CBR), and the like;

another access technology measurement information of the first terminal, which may include a received signal situation of the WLAN link, for example, reference signal receiving power, or may include a saturation situation of the WLAN link, and the like;

service information that an another access technology interface of the first terminal tends to transmit; or a transmission tendency of the first terminal for the SL interface and the another access technology interface.

The first terminal reporting the configuration assistance information may be based on a function switch of a network. For example, only when the terminal capability information is reported in a cell supporting an SL function and the network configures a switch of the service information that the SL interface of the first terminal tends to transmit, the service information that the SL interface of the first terminal tends to transmit is reported; and the another access technology measurement information of the first terminal is only reported in a cell supporting the SL-WLAN aggregation.

The dedicated aggregation configuration may generally include the following content:

First, the network maps QoS flows of the first terminal to corresponding RBs.

The network provides aggregation attributes for these RBs. For example, if an RB is defaulted as an SL bearer, it may be configured as a switched WLAN bearer or a split WLAN bearer;

if the RB is the SL bearer, SDAP/PDCP/RLC/MAC and other layer configurations are provided according to existing configuration content;

if the RB is a switched WLAN RB, a SDAP/PDCP layer configuration is provided, and an SL-WLAN aggregation AP layer configuration, such as a DRB ID field size, may also be provided; and if the RB is a split WLAN RB, the SDAP/PDCP layer configuration and an RLC bearer configuration are provided, and the SL-WLAN aggregation AP layer configuration, such as the DRB ID field size, may also be provided.

A method of a WLAN specific identifier, such as a data type or label, may also be configured, so that aggregated data is distinguished from common WLAN data.

In this embodiment of this application, a configuration between terminals is determined by a sending terminal (namely, a first terminal), and then is sent to a receiving terminal. The sending terminal refers to an initiator of a service, and the receiving terminal refers to a receiver of the service. For a two-directional service, the two terminals may be the sending terminal and the receiving terminal. For each direction, the sending terminal determines the configuration and sends the configuration to the receiving terminal. In a case of the two-directional service, if configurations determined by the two terminals are inconsistent or conflict, conflict resolution is performed, that is, one party agrees with the configuration of the other party; or configuration failure processing is performed.

After the first terminal obtains the second aggregation configuration information of the network side, at least one of the following operations is included:

Because the sending terminal in the connected state reported the detailed service information and obtains the aggregation attribute information and detailed configuration information of each RB by the network side, the sending terminal may directly send the detailed information configured by the network side to the receiving terminal.

Because the sending terminal in the idle state or the inactive state or the offline state obtains common aggregation information, the sending terminal needs to correspondingly select aggregation attribute information suitable for services thereof according to the information, obtains responded RB detailed configuration information according to a selection result, and sends the RB configuration information to the receiving terminal.

If there is a switched WLAN bearer or a split WLAN bearer in the above process, it means that an association between a WLAN link and an SL link needs to be established between the sending terminal and the receiving terminal. Therefore, when or after the sending terminal sends first aggregation configuration information to the receiving terminal, the sending terminal needs to inform information about a WLAN MAC address thereof to the receiving terminal, so that the receiving terminal can establish a correct association between the WLAN link and the SL link. A method of a WLAN specific identifier, such as a data type or label, may also be exchanged, so that aggregated data is distinguished from common WLAN data.

After an aggregation configuration, a symmetrical bearer configuration is established between the sending terminal and the receiving terminal. For an SL bearer, a data transmission manner thereof may completely use the existing process. This embodiment focuses on how the switched WLAN bearer (namely, a first bearer) and the split WLAN bearer (namely, a second bearer) perform data transmission.

For the first bearer, the method further includes:

mapping a QoS flow of the first terminal to the configured first bearer;

mapping the first bearer to a packet data convergence protocol PDCP entity, to form a PDCP Protocol Data Unit (PDU); and encapsulating the PDCP PDU, and transmitting, after adding new header information, the PDCP PDU to the another access technology interface for transmission, where the header information carries an identifier of the first bearer.

For example, the sending terminal maps a QoS flow to a configured PDCP entity according to a normal process, and the PDCP entity performs processing such as header compression and security, and adds a PDCP header, to form a PDCP PDU; the PDCP PDU is sent to a corresponding SL-WLAN aggregation AP layer, and at this layer, the PDCP PDU is encapsulated, and a new header is added, where header information carries an RB ID; the PDU formed at the SL-WLAN aggregation AP layer is sent to a WLAN L2/L1, and for this type of data, a WLAN specific identifier, such as a data type or label, is used, so that aggregated data is distinguished from common WLAN data; a WLAN MAC address that has been exchanged is used, to facilitate identification of the receiving terminal; and the data is sent by a WLAN interface.

For the second bearer, the method further includes:

mapping a QoS flow of the first terminal to the configured second bearer;

mapping the second bearer to a packet data convergence protocol PDCP entity, to form a PDCP protocol data unit PDU; and encapsulating the PDCP PDU in a case that the PDCP PDU is transmitted to an AP layer, and transmitting, after adding new header information, the PDCP PDU to the another access technology interface for transmission, where the header information carries an identifier of the second bearer.

For example, the sending terminal maps a QoS flow to a configured PDCP entity according to a normal process, and the PDCP entity performs processing such as header compression and security, and adds a PDCP header, to form a PDCP PDU; a PDCP layer determines to send the PDCP PDU to SL RLC or an SL-WLAN aggregation AP layer on a WLAN side according to the first aggregation configuration information; if the PDCP PDU is sent to the SL RLC, the existing process is performed; if the PDCP PDU is sent to the corresponding SL-WLAN aggregation AP layer, at this layer, the PDCP PDU is encapsulated, and a new header is added, where header information carries an RB ID; and the PDU formed at the SL-WLAN aggregation AP layer is sent to a WLAN L2/L1, and for this type of data, a specific identifier, such as a data type or label, is used, so that aggregated data is distinguished from common WLAN data; a WLAN MAC address that has been exchanged is used, to facilitate identification of the receiving terminal; and the data is sent by a WLAN interface.

It should be noted that, data to which the new header information is added corresponds to a specific identifier of the another access technology, and the specific identifier is used for indicating that the data is data related to aggregation.

For example, the specific identifier is a specific port number or an identifier of the WLAN. The specific identifier is carried by the sending terminal, the receiving terminal parses the specific identifier, and transmits a data packet to the SL-WLAN aggregation AP layer, and the AP layer determines a corresponding PDCP entity through a bearer identifier in the header information.

In conclusion, in the embodiments of this application, first aggregation configuration information used for configuring an aggregation operation of a sidelink SL between a first terminal and a second terminal and another access technology is transmitted through a PC5 interface between the first terminal and the second terminal, so that the first terminal and the second terminal can better use the aggregation operation of the SL and the another access technology under control of a network, thereby improving service rates of the terminals, ensuring the quality of service of a terminal service, and ensuring the system efficiency while improving the user experience.

Figure 4:
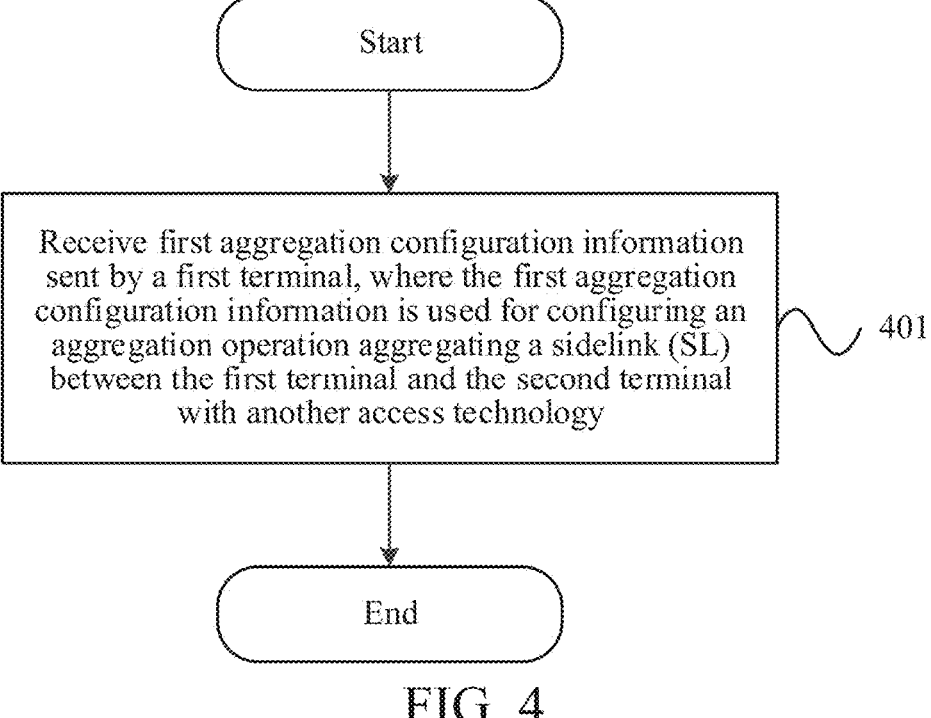
FIG. 4 is a second schematic diagram of steps of an aggregation configuration method according to an embodiment of this application.

As shown in FIG. 4, an embodiment of this application further provides an aggregation configuration method, applied to a second terminal. The method includes the following steps.

Step 401. Receive first aggregation configuration information sent by a first terminal, where the first aggregation configuration information is used for configuring an aggregation operation of a sidelink SL between the first terminal and the second terminal and another access technology.

For example, the first terminal sends the first aggregation configuration information to the second terminal by using a PC5 RRC message or an another layer message (for example, a MAC control element or an L2 control message).

In this embodiment of this application, the another access technology may be a WLAN, behavioral hotspot Wifi, Bluetooth, or the like, which is not specifically limited herein. Correspondingly, an another access technology interface involved in this embodiment of this application is a WLAN interface, a Wifi interface, a Bluetooth interface, or the like. For convenience of description, the another access technology being a WLAN technology is used as an example for description in the following embodiments of this application.

The WLAN interface or the Wifi interface or the Bluetooth interface uses an unlicensed spectrum and shares a bandwidth, so that the fee is low or there is no fee. In addition, a terminal has a WLAN or Wifi interface or a Bluetooth interface as standard, so that there is no additional hardware cost. In addition, an SL interface between terminals supports an aggregation operation with the WLAN. In this way, the transmission efficiency between users can be greatly improved, and route configurations of different services can be performed according to characteristics of the services, thereby improving the user experience on a basis of ensuring the Quality of Service (QoS).

In this embodiment of this application, SL and WLAN aggregation means that, in an existing SL architecture, some data flows need to be offloaded to the WLAN for transmission and unified management and control. An SL and WLAN aggregation architecture includes the following bearer types:

First bearer (may also be referred to as switched WLAN bearer): a bearer that performs transmission completely by WLAN interface and resources, where the bearer may be a user data bearer or a signaling bearer. However, the WLAN is not used for dedicated transmission signaling due to unreliability thereof.

Second bearer (may also be referred to as split WLAN bearer): a bearer that can perform transmission by SL interface and resources and the WLAN interface and resources, where the bearer may be a user data bearer or a signaling bearer.

Third bearer (may also be referred to as SL bearer): a bearer that performs transmission completely by the SL interface and resources, where the bearer may be a user data bearer or a signaling bearer.

In some embodiments, the first aggregation configuration information includes at least one of the following:

configuration information of a first bearer capable of performing transmission through an another access technology interface;

information about a quality of service QoS flow mapped to the first bearer;

configuration information of a second bearer capable of performing transmission through an SL interface and the another access technology interface;

information about a QoS flow mapped to the second bearer;

information about an interface or a port for data transmission using the another access technology;

configuration information of a third bearer capable of performing transmission through the SL interface;

information about a QoS flow mapped to the third bearer; or information about an another access technology media access control MAC address of the first terminal.

A sending terminal and a receiving terminal perform data transmission and receiving operations according to a configuration. The second bearer may perform transmission by the SL interface and the WLAN interface. The PDCP layer performs reordering and replication operations. The first bearer is the bearer that performs transmission completely by the WLAN interface, and also has an SL PDCP layer protocol stack. It should be noted that, as long as data is transmitted by the WLAN interface, the SL-WLAN aggregation AP layer needs to identify a bearer. That is, an AP layer at which the SL and the another access technology are aggregated carries a bearer identifier for the first bearer or the second bearer through a data packet transmitted by using the another access technology.

In some embodiments, before step 401, the method further includes:

exchanging terminal capability information with the first terminal, where the terminal capability information is used for indicating whether the aggregation operation of the SL and the another access technology is supported; and correspondingly, step 401 includes:

receiving, in a case that both the first terminal and the second terminal support the aggregation operation of the SL and the another access technology, the first aggregation configuration information sent by the first terminal.

In this embodiment of this application, before an aggregation configuration is performed, the sending terminal and the receiving terminal may carry capability information about whether to support the aggregation operation of the SL and the another access technology in a capability negotiation process. If one party does not support the aggregation operation, the aggregation cannot be configured.

Continuing the above embodiment, in this embodiment of this application, the method further includes:

sending information about an another access technology MAC address of the second terminal to the first terminal.

There is a one-to-one correspondence between links of the SL and the another access technology capable of performing the aggregation operation, where the link of the another access technology is determined by the another access technology MAC address of the first terminal included in the first aggregation configuration information and the another access technology MAC address of the second terminal sent by the second terminal.

For a correspondence between the WLAN and the SL, WLAN MAC addresses of the two terminals are exchanged through PC5 RRC, in other words, there is an aggregation relationship between data received from the notified pair of WLAN MAC addresses and a corresponding SL bearer. For example, if two pieces of PC5 RRC are established between the sending terminal and the receiving terminal, two pairs of WLAN MAC addresses are required to correspond to the two pieces of PC5 RRC in a one-to-one manner. In this way, data of an SL1 and a WLAN MAC address pair 1 can be aggregated, and data of an SL2 and a WLAN MAC address pair 2 can be aggregated, thereby avoiding confusion.

For the receiving terminal, the receiving first aggregation configuration information of the sending terminal includes the following behaviors:

First, it is determined whether the first aggregation configuration information of the sending terminal may be supported, for example, whether the WLAN is available, and whether a configuration conflict. When the configuration information may be supported, a corresponding bearer is configured according to the configuration information, and a response is returned to the sending terminal to indicate that the configuration is successful, and when there is a WLAN-related bearer, a WLAN MAC address of the receiving terminal is carried in response information, so that the sending terminal establishes a correct association between an SL link and a WLAN link.

If the receiving terminal cannot accept the first aggregation configuration information, for example, the WLAN is unavailable, or the configuration conflicts, new configuration information may be suggested to the sending terminal, and when there is a WLAN-related bearer, a WLAN MAC address of the receiving terminal is carried in the new configuration information, so that the sending terminal establishes the correct association between the SL link and the WLAN link. In some embodiments, if the receiving terminal cannot accept the first aggregation configuration information, a configuration failure is returned to the sending terminal.

In some embodiments, the method further includes:

receiving data through the another access technology interface;

determining, in a case that the received data is data related to aggregation, an AP layer at which the corresponding SL and the another access technology are aggregated according to the another access technology MAC address;

determining, by the AP layer, a corresponding PDCP entity according to an identifier of a bearer carried in header information, and sending a parsed data part to the corresponding PDCP entity; and performing, by the PDCP entity, reordering as needed, and sending a parsed PDCP service data unit SDU to an upper layer.

After an aggregation configuration, a symmetrical bearer configuration is established between the sending terminal and the receiving terminal. For an SL bearer, a data transmission manner thereof may completely use the existing process. This embodiment focuses on how the switched WLAN bearer (namely, a first bearer) and the split WLAN bearer (namely, a second bearer) perform data transmission.

For example, for the first bearer, data reception includes:

receiving data through the WLAN interface; identifying, through a specific identifier that is negotiated and configured, that the data is SL-WLAN aggregation data;

learning, after WLAN L1/L2 processing, a binding relationship of data of which terminal and a layer L2 ID according to a WLAN MAC address, to find a corresponding SL-WLAN aggregation AP layer; parsing a PDU of the SL-WLAN aggregation AP layer; determining a corresponding PDCP entity according to a bearer identifier carried in header information, and sending a parsed data part to a PDCP; and performing, by the PDCP, reordering as needed, performing normal operations such as header removing, decompression, and desecurity, and sending a parsed PDCP SDU to an upper layer in sequence/out of order (only bearers configured with out-of-delivery can be delivered out of order; otherwise, all need to be delivered in sequence).

For the second bearer, data reception includes:

if data is received by an SL RLC side, reusing an existing process to reach a PDCP entity;

if data is received by a WLAN interface, identifying, through a specific identifier that is negotiated and configured, that the data is SL-WLAN aggregation data; learning, after WLAN L1/L2 processing, a binding relationship of data of which terminal and a layer L2 ID according to a WLAN MAC address, to find a corresponding SL-WLAN aggregation AP layer; parsing a PDU of the SL-WLAN aggregation AP layer; determining a corresponding PDCP entity according to a bearer identifier carried in header information, and sending a parsed data part to a PDCP; and performing, by the PDCP, reordering as needed, performing normal operations such as header removing, decompression, and desecurity, and sending a parsed PDCP SDU to an upper layer in sequence/out of order (only bearers configured with out-of-delivery can be delivered out of order; otherwise, all need to be delivered in sequence).

It should be noted that, the data received through the another access technology interface corresponds to a specific identifier of the another access technology, and the specific identifier is used for indicating that the data is data related to aggregation.

For example, the specific identifier is a specific port number or an identifier of the WLAN. The specific identifier is carried by the sending terminal, the receiving terminal parses the specific identifier, and transmits a data packet to the SL-WLAN aggregation AP layer, and the AP layer determines a corresponding PDCP entity through a bearer identifier in the header information.

In the embodiments of this application, first aggregation configuration information used for configuring an aggregation operation of a sidelink SL between a first terminal and a second terminal and another access technology is transmitted through a PC5 interface between the first terminal and the second terminal, so that the first terminal and the second terminal can better use the aggregation operation of the SL and the another access technology under control of a network, thereby improving service rates of the terminals, ensuring the quality of service of a terminal service, and ensuring the system efficiency while improving the user experience.

It should be noted that, in the aggregation configuration method provided in the embodiments of this application, an execution entity may be an aggregation configuration apparatus, or a control module configured to execute the aggregation configuration method in the aggregation configuration apparatus. In this embodiment of this application, an example in which the aggregation configuration apparatus executes the aggregation configuration method is used to describe the aggregation configuration apparatus provided in the embodiments of this application.

Figure 5:
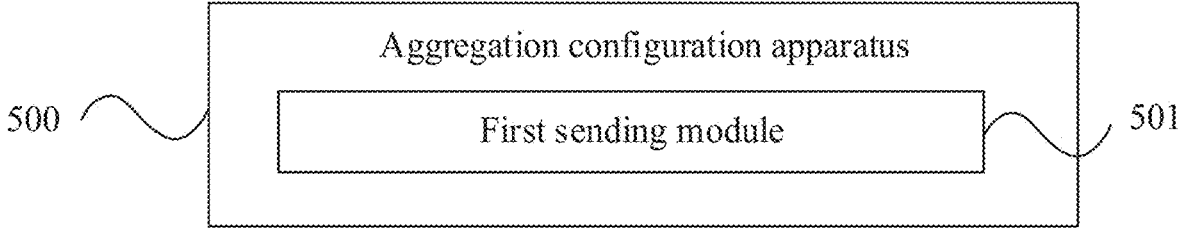
FIG. 5 is a first schematic structural diagram of an aggregation configuration apparatus according to an embodiment of this application.

As shown in FIG. 5, an embodiment of this application further provides an aggregation configuration apparatus 500, applied to a first terminal. The apparatus includes:

a first sending module 501, configured to send first aggregation configuration information to a second terminal, where the first aggregation configuration information is used for configuring an aggregation operation of a sidelink SL between the first terminal and the second terminal and another access technology.

In some embodiments, the first aggregation configuration information includes at least one of the following:

configuration information of a first bearer capable of performing transmission through an another access technology interface;

information about a quality of service QoS flow mapped to the first bearer;

configuration information of a second bearer capable of performing transmission through an SL interface and the another access technology interface;

information about a QoS flow mapped to the second bearer;

information about an interface or a port for data transmission using the another access technology;

configuration information of a third bearer capable of performing transmission through the SL interface;

information about a QoS flow mapped to the third bearer; or information about an another access technology media access control MAC address of the first terminal.

In some embodiments, an AP layer at which the SL and the another access technology are aggregated carries a bearer identifier for the first bearer or the second bearer through a data packet transmitted by using the another access technology.

In some embodiments, the apparatus further includes:

a first interaction module, configured to exchange terminal capability information with the second terminal, where the terminal capability information is used for indicating whether the aggregation operation of the SL and the another access technology is supported; and the first sending module includes:

a first sending sub-module, configured to send, in a case that both the first terminal and the second terminal support the aggregation operation of the SL and the another access technology, the first aggregation configuration information to the second terminal.

In some embodiments, the apparatus further includes:

a second receiving module, configured to receive information about an another access technology MAC address of the second terminal sent by the second terminal.

In some embodiments, there is a one-to-one correspondence between links of the SL and the another access technology capable of performing the aggregation operation, where the link of the another access technology is determined by the another access technology MAC address of the first terminal included in the first aggregation configuration information and the another access technology MAC address of the second terminal sent by the second terminal.

In some embodiments, the apparatus further includes:

a third receiving module, configured to receive second aggregation configuration information configured by a network-side device, where the second aggregation configuration information is used for configuring an aggregation operation of an SL and another access technology; and a determining module, configured to determine the first aggregation configuration information according to the second aggregation configuration information.

In some embodiments, the second aggregation configuration information includes at least one of the following:

supporting the aggregation operation of the SL and the another access technology;

a characteristic of a service capable of performing trans-
mission using the another access technology;

QoS flow information of the service capable of perform-
ing the transmission using the another access technol-
ogy;

bearer information of the service capable of performing
the transmission using the another access technology;

configuration information of another layer corresponding
to the service capable of performing the transmission
using the another access technology;

a characteristic of a service capable of performing off-
loading or retransmission using the another access
technology;

QoS flow information of the service capable of perform-
ing the offloading or retransmission using the another
access technology;

bearer information of the service capable of performing
the offloading or retransmission using the another
access technology;

configuration information of another layer corresponding
to the service capable of performing the offloading or
retransmission using the another access technology;

a characteristic of a service capable of performing SL
transmission;

QoS flow information of the service capable of perform-
ing the SL transmission;

bearer information of the service capable of performing
the SL transmission;

configuration information of another layer corresponding
to the service capable of performing the SL transmis-
sion; or information about an interface or a port for data trans-
mission using the another access technology.

In some embodiments, the third receiving module
includes:

a third receiving sub-module, configured to receive, in a
case that the first terminal is in an RRC connected state,
radio resource control RRC signaling sent by the net-
work-side device; or receive, in a case that the first terminal is in an idle state
or an inactive state, a system information block (SIB)
message sent by the network-side device; or obtain pre-configuration information in a case that the first
terminal is in an offline state, where the SIB message or the RRC signaling or the pre-con-
figuration information includes the second aggregation
configuration information.

In some embodiments, in a case that the first terminal is
in an RRC connected state, the apparatus further includes:

a reporting module, configured to report configuration
assistance information to the network-side device,
where the configuration assistance information
includes at least one of the following:

terminal capability information, where the terminal capa-
bility information is used for indicating whether the
first terminal supports an aggregation operation of the
SL and a WLAN;

service information that an SL interface of the first
terminal tends to transmit, SL measurement information of the first terminal;

another access technology measurement information of
the first terminal;

service information that an another access technology
interface of the first terminal tends to transmit; or a transmission tendency of the first terminal for the SL
interface and the another access technology interface.

In some embodiments, the apparatus further includes:

a first module, configured to map a QoS flow of the first
terminal to the configured first bearer;

a second module, configured to map the first bearer to a
packet data convergence protocol PDCP entity, to form
a PDCP protocol data unit PDU; and a third module, configured to encapsulate the PDCP PDU,
and transmit, after adding new header information, the
PDCP PDU to the another access technology interface
for transmission, where the header information carries
an identifier of the first bearer.

In some embodiments, the apparatus further includes:

a fourth module, configured to map a QoS flow of the first
terminal to the configured second bearer;

a fifth module, configured to map the second bearer to a
packet data convergence protocol PDCP entity, to form
a PDCP protocol data unit PDU; and a sixth module, configured to encapsulate the PDCP PDU
in a case that the PDCP PDU is transmitted to an AP
layer, and transmit, after adding new header informa-
tion, the PDCP PDU to the another access technology
interface for transmission, where the header informa-
tion carries an identifier of the second bearer.

In some embodiments, data to which the new header
information is added corresponds to a specific identifier of
the another access technology, and the specific identifier is
used for indicating that the data is data related to aggrega-
tion.

In the embodiments of this application, first aggregation
configuration information used for configuring an aggrega-
tion operation of a sidelink SL between a first terminal and
a second terminal and another access technology is trans-
mitted through a PC5 interface between the first terminal
and the second terminal, so that the first terminal and the
second terminal can better use the aggregation operation of
the SL and the another access technology under control of a
network, thereby improving service rates of the terminals,
ensuring the quality of service of a terminal service, and
ensuring the system efficiency while improving the user
experience.

It should be noted that, the aggregation configuration
apparatus provided in embodiments of this application is an
apparatus that can execute the above aggregation configu-
ration method, and all embodiments of the above aggrega-
tion configuration method are applicable to the apparatus,
and can achieve same or similar effects.

Figure 6:
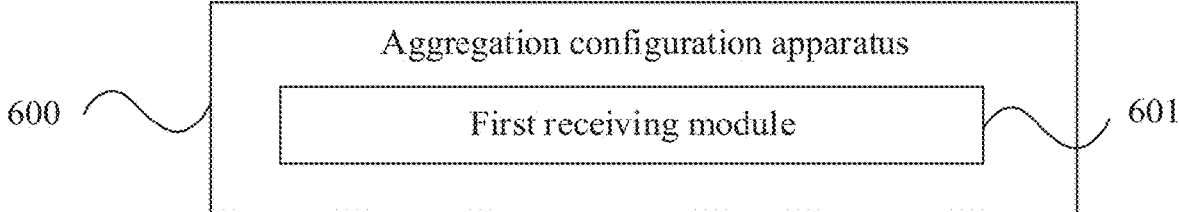
FIG. 6 is a second schematic structural diagram of an aggregation configuration apparatus according to an embodiment of this application.

As shown in FIG. 6, an embodiment of this application
further provides an aggregation configuration apparatus 600,
applied to a second terminal. The apparatus includes:

a first receiving module 601, configured to receive first
aggregation configuration information sent by a first
terminal, where the first aggregation configuration
information is used for configuring an aggregation
operation of a sidelink SL between the first terminal
and the second terminal and another access technology.

In some embodiments, the first aggregation configuration
information includes at least one of the following:

configuration information of a first bearer capable of
performing transmission through an another access
technology interface;

information about a quality of service QoS flow mapped
to the first bearer;

configuration information of a second bearer capable of
performing transmission through an SL interface and
the another access technology interface;

information about a QoS flow mapped to the second
bearer;

information about an interface or a port for data transmission using the another access technology;

configuration information of a third bearer capable of performing transmission through the SL interface;

information about a QoS flow mapped to the third bearer; or information about an another access technology media access control MAC address of the first terminal.

In some embodiments, an AP layer at which the SL and the another access technology are aggregated carries a bearer identifier for the first bearer or the second bearer through a data packet transmitted by using the another access technology.

In some embodiments, the apparatus further includes:

a second interaction module, configured to exchange terminal capability information with the first terminal, where the terminal capability information is used for indicating whether the aggregation operation of the SL and the another access technology is supported; and the first receiving module includes:

a first receiving sub-module, configured to receive, in a case that both the first terminal and the second terminal support the aggregation operation of the SL and the another access technology, the first aggregation configuration information sent by the first terminal.

In some embodiments, the apparatus further includes:

a second sending module, configured to send information about an another access technology MAC address of the second terminal to the first terminal.

In some embodiments, there is a one-to-one correspondence between links of the SL and the another access technology capable of performing the aggregation operation, where the link of the another access technology is determined by the another access technology MAC address of the first terminal included in the first aggregation configuration information and the another access technology MAC address of the second terminal sent by the second terminal.

In some embodiments, the apparatus further includes:

a seventh module, configured to receive data through the another access technology interface;

an eighth module, configured to determine, in a case that the received data is data related to aggregation, an AP layer at which the corresponding SL and the another access technology are aggregated according to the another access technology MAC address;

a ninth module, configured to determine, by the AP layer, a corresponding PDCP entity according to an identifier of a bearer carried in header information, and send a parsed data part to the corresponding PDCP entity; and a tenth module, configured to perform, by the PDCP entity, reordering as needed, and send a parsed PDCP service data unit SDU to an upper layer.

In some embodiments, the data received through the another access technology interface corresponds to a specific identifier of the another access technology, and the specific identifier is used for indicating that the data is data related to aggregation.

In the embodiments of this application, first aggregation configuration information used for configuring an aggregation operation of a sidelink SL between a first terminal and a second terminal and another access technology is transmitted through a PC5 interface between the first terminal and the second terminal, so that the first terminal and the second terminal can better use the aggregation operation of the SL and the another access technology under control of a network, thereby improving service rates of the terminals, ensuring the quality of service of a terminal service, and ensuring the system efficiency while improving the user experience.

It should be noted that, the aggregation configuration apparatus provided in embodiments of this application is an apparatus that can execute the above aggregation configuration method, and all embodiments of the above aggregation configuration method are applicable to the apparatus, and can achieve same or similar effects.

The aggregation configuration apparatus in this embodiment of this application may be an apparatus, or may be a component, an integrated circuit, or a chip in a terminal. The apparatus may be a mobile electronic device or a non-mobile electronic device. Exemplarily, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like, and the non-mobile electronic device may be a server, a network attached memory (NAS), a personal computer (PC), a television (TV), a teller machine, a self-service machine, or the like. This is not specifically limited in this embodiment of this application.

The aggregation configuration apparatus in this embodiment of this application may be an apparatus having an operating system. The operating system may be an android operating system, may be an ios operating system, and may also be another possible operating system. This is not specifically limited in this embodiment of this application.

The aggregation configuration apparatus provided in this embodiment of this application can implement all processes implemented by the method embodiments of FIG. 1 to FIG. 4. To avoid repetition, details are not described herein again.

Figure 7:
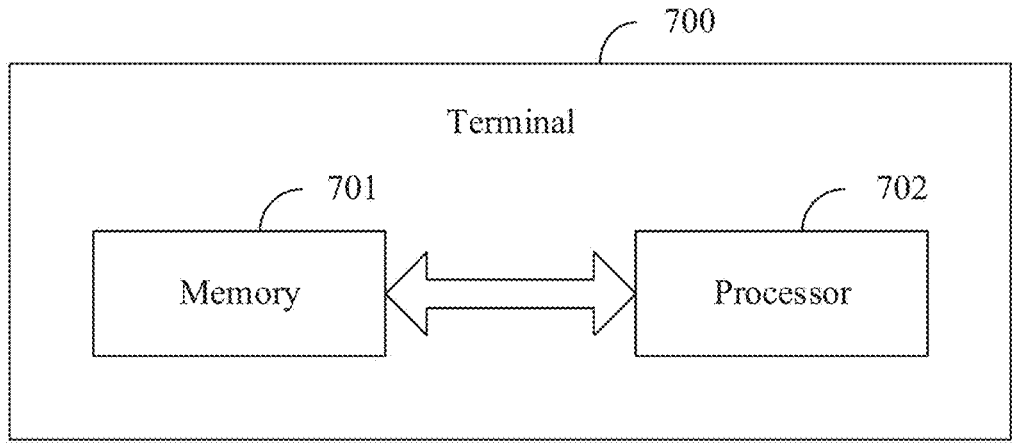
FIG. 7 is a first schematic structural diagram of a terminal according to an embodiment of this application.

As shown in FIG. 7, an embodiment of this application further provides a terminal 700, including a processor 701, a memory 702, and a program or instruction stored on the memory 702 and executable on the processor 701. The program or instruction, when executed by the processor 701, implements all processes of the embodiments of the above aggregation configuration method, and can achieve the same technical effects. To avoid repetition, details are not described herein again.

Figure 8:
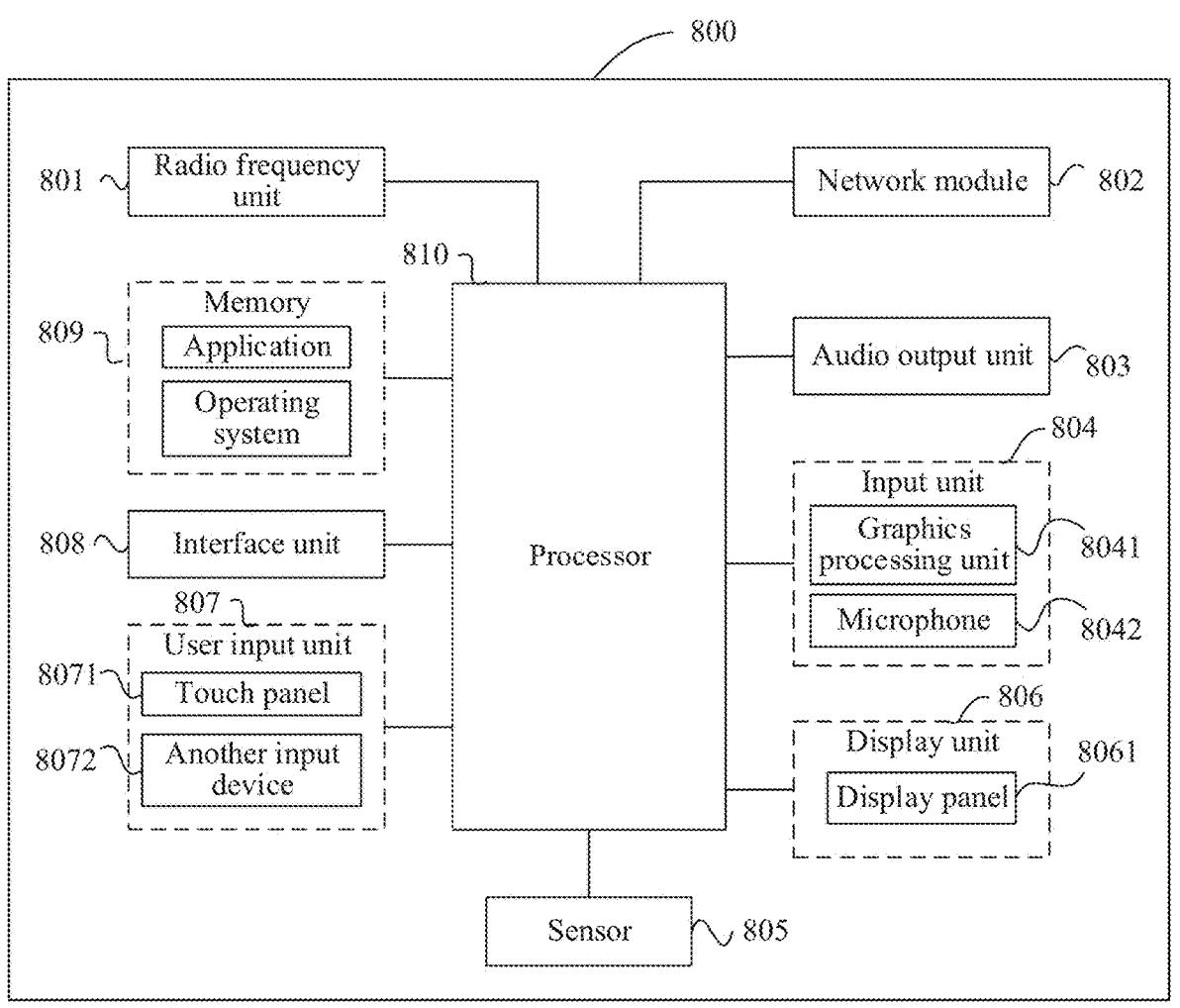
FIG. 8 is a second schematic structural diagram of a terminal according to an embodiment of this application.

FIG. 8 is a schematic diagram of a hardware structure of a terminal that implements the embodiments of this application.

A terminal 800 includes, but is not limited to, components such as a radio frequency unit 801, a network module 802, an audio output unit 803, an input unit 804, a sensor 805, a display unit 806, a user input unit 807, an interface unit 808, a memory 809, and a processor 810.

A person skilled in the art may understand that the terminal 800 further includes a power supply (such as a battery) for supplying power to the components. The power supply may logically connect to the processor 810 by using a power supply management system, thereby implementing functions, such as charging, discharging, and power consumption management, by using the power supply management system. A terminal structure shown in FIG. 8 does not constitute a limitation to the terminal, and the terminal may include more or fewer components than those shown in the figure, or some components may be combined, or a different component deployment may be used. Details are not described herein again.

It should be understood that, in this embodiment of this application, the input unit 804 may include a Graphics Processing Unit (GPU) 8041 and a microphone 8042. The graphics processing unit 8041 performs processing on image data of a static picture or a video that is obtained by an image acquisition apparatus (for example, a camera) in a video acquisition mode or an image acquisition mode. The display unit 806 may include a display panel 8061, for example, the display panel 8061 may be configured in a form such as a liquid crystal display or an organic light-emitting diode. The user input unit 807 includes a touch panel 8071 and another input device 8072. The touch panel 8071 is also referred to as a touch screen. The touch panel 8071 may include two parts: a touch detection apparatus and a touch controller. The another input device 8072 may include, but is not limited to, a physical keyboard, a functional key (for example, a volume control key or a switch key), a track ball, a mouse, and a joystick, and the details will not be described herein again.

In this embodiment of this application, the radio frequency unit 801 receives downlink data from a network-side device and sends downlink data to the processor 810 for processing. In addition, the radio frequency unit sends uplink data to the network-side device. Generally, the radio frequency unit 801 includes, but is not limited to, an antenna, at least one amplifier, a transceiver, a coupler, a low noise amplifier, a duplexer, and the like.

The memory 809 may be configured to store a software program or instruction and various data. The memory 809 may mainly include a program or instruction storage region and a data storage region. The program or instruction storage region may store an operating system, an application program or instruction required by at least one function (for example, a sound playback function and an image playback function), or the like. In addition, the memory 809 may include a high speed random access memory, and may also include a non-volatile memory. The non-volatile memory may be a Read-Only Memory (ROM), a Programmable ROM (PROM), an Erasable PROM (EPROM), an Electrically EPROM (EEPROM), or a flash memory. For example, the non-volatile memory may be at least one magnetic disk storage device, a flash memory device, or other volatile solid-state storage devices.

In some embodiments, the processor 810 may include one or more processing units. In some embodiments, the processor 810 may integrate an application processor and a modem. The application processor mainly processes an operating system, a user interface, an application program or instruction, and the like. The modem mainly processes wireless communication, such as a baseband processor. It may be understood that the foregoing modem may not be integrated into the processor 810.

The radio frequency unit 801 is configured to send first aggregation configuration information to a second terminal, where the first aggregation configuration information is used for configuring an aggregation operation of a sidelink SL between the first terminal and the second terminal and another access technology.

In some embodiments, the radio frequency unit 801 is configured to receive first aggregation configuration information sent by a first terminal, where the first aggregation configuration information is used for configuring an aggregation operation of a sidelink SL between the first terminal and the second terminal and another access technology.

In the embodiments of this application, first aggregation configuration information used for configuring an aggregation operation of a sidelink SL between a first terminal and a second terminal and another access technology is transmitted through a PC5 interface between the first terminal and the second terminal, so that the first terminal and the second terminal can better use the aggregation operation of the SL and the another access technology under control of a network, thereby improving service rates of the terminals, ensuring the quality of service of a terminal service, and ensuring the system efficiency while improving the user experience.

It should be noted that, the terminal provided in embodiments of this application is a terminal that can execute the above aggregation configuration method, and all embodiments of the above aggregation configuration method are applicable to the terminal, and can achieve same or similar effects.

An embodiment of this application further provides a readable storage medium, storing a program or instruction. The program or instruction, when executed by a processor, implements all processes of the embodiments of the above aggregation configuration method, and can achieve the same technical effects. To avoid repetition, details are not described herein again.

The processor is the processor in the above electronic device in the foregoing embodiments. The readable storage medium includes a computer-readable storage medium, for example, a computer Read-Only Memory (ROM), a Random Access Memory (RAM), a magnetic disk, or an optical disc.

An embodiment of this application further provides a chip, including: a processor and a communication interface, where the communication interface is coupled to the processor, and the processor is configured to run a program or instruction, to implement all processes of the embodiments of the above aggregation configuration method, and can achieve the same technical effects. To avoid repetition, details are not described herein again.

It should be understood that, the chip mentioned in this embodiment of this application may also be referred to as a system-level chip, a system chip, a chip system, a system on chip, or the like.

It should be noted that, the term "include", "comprise" or any other variation thereof in this specification is intended to cover a non-exclusive inclusion, which specifies the presence of stated processes, methods, objects, or apparatuses, but does not preclude the presence or addition of one or more other processes, methods, objects, or apparatuses. Without more limitations, elements defined by the sentence "including one . . . " does not exclude that there are still other same elements in the processes, methods, objects, or apparatuses. In addition, it should be noted that the scope of the methods and apparatuses in the implementations of this application is not limited to performing the functions in the order shown or discussed, but may also include performing, according to involved functions, the functions basically simultaneously or in a reverse order. For example, the described methods may be performed in an order different from that described, and various steps may also be added, omitted, or combined. In addition, features described with reference to some examples may be combined in other examples.

Through the descriptions of the foregoing implementations, a person skilled in the art may clearly understand that the method according to the foregoing embodiments may be implemented by means of software and a necessary general hardware platform, and may be implemented by hardware, but in many cases, the former manner is a better implementation. Based on such an understanding, the technical solutions in this application essentially or the part contributing to the existing technologies may be implemented in the form of a software product. The computer software product is stored in a storage medium (for example, a read-only memory (ROM)/random access memory (RAM), a magnetic disk or an optical disc), and includes several instructions for instructing a terminal (which may be a mobile phone, a computer, a server, an air conditioner, a network device, or the like) to perform the method described in the embodiments of this application.

The embodiments of this application are described above with reference to the accompanying drawings. However, this application is not limited to the foregoing specific implementations. The foregoing specific implementations are illustrative instead of limitative. Enlightened by this application, a person of ordinary skill in the art can make many forms without departing from the idea of this application and the scope of protection of the claims. All of the forms fall within the protection of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An aggregation configuration method, performed by a first terminal, comprising:

sending first aggregation configuration information to a second terminal, wherein the first aggregation configuration information is used for configuring an aggregation operation aggregating a sidelink (SL) between the first terminal and the second terminal with another access technology, wherein the first aggregation configuration information comprises:

configuration information of a second bearer to which transmission is to be performed through an SL interface and an interface of another access technology; and at least one of the following:

configuration information of a first bearer to which transmission is to be performed through the interface of the another access technology;

information about a quality of service (QoS) flow mapped to the first bearer;

information about a QoS flow mapped to the second bearer;

information about an interface or a port for data transmission using the another access technology;

configuration information of a third bearer to which transmission is to be performed through the SL interface;

information about a QoS flow mapped to the third bearer; or information about a media access control (MAC) address of the another access technology of the first terminal.

2. The aggregation configuration method according to claim 1, wherein an AP layer at which the SL and the another access technology are aggregated carries a bearer identifier for the first bearer or the second bearer through a data packet transmitted by using the another access technology.

3. The aggregation configuration method according to claim 1, wherein before sending the first aggregation configuration information to the second terminal, the method further comprises:

exchanging terminal capability information with the second terminal, wherein the terminal capability information is used for indicating whether the aggregation operation of the SL and the another access technology is supported; and sending the first aggregation configuration information to the second terminal comprises:

sending, when both the first terminal and the second terminal support the aggregation operation of the SL and the another access technology, the first aggregation configuration information to the second terminal.

4. The aggregation configuration method according to claim 1, further comprising:

receiving information, sent by the second terminal, about a MAC address of the another access technology of the second terminal.

5. The aggregation configuration method according to claim 4, wherein there is a one-to-one correspondence between links of the SL and the another access technology to which the aggregation operation is to be performed, wherein the link of the another access technology is determined based on the MAC address of the another access technology of the first terminal comprised in the first aggregation configuration information and the MAC address of the another access technology of the second terminal sent by the second terminal.

6. The aggregation configuration method according to claim 1, wherein before sending the first aggregation configuration information to the second terminal, the method further comprises:

receiving second aggregation configuration information configured by a network-side device, wherein the second aggregation configuration information is used for configuring an aggregation operation of the SL and the another access technology; and determining the first aggregation configuration information according to the second aggregation configuration information.

7. The aggregation configuration method according to claim 6, wherein the second aggregation configuration information comprises at least one of the following:

supporting the aggregation operation of the SL and the another access technology;

a characteristic of a service to which transmission is to be performed using the another access technology;

QoS flow information of the service to which the transmission is to be performed using the another access technology;

bearer information of the service to which the transmission is to be performed using the another access technology;

configuration information of another layer corresponding to the service to which the transmission is to be performed using the another access technology;

a characteristic of a service to which offloading or retransmission is to be performed using the another access technology;

QoS flow information of the service to which the offloading or retransmission is to be performed using the another access technology;

bearer information of the service to which the offloading or retransmission is to be performed using the another access technology;

configuration information of another layer corresponding to the service to which the offloading or retransmission is to be performed using the another access technology;

a characteristic of a service to which SL transmission is to be performed;

QoS flow information of the service to which the SL transmission is to be performed;

bearer information of the service to which the SL transmission is to be performed;

configuration information of another layer corresponding to the service to which the SL transmission is to be performed; or information about an interface or a port for data transmission using the another access technology.

8. The aggregation configuration method according to claim 6, wherein receiving the second aggregation configuration information configured by the network-side device comprises one of the following:

receiving, when the first terminal is in a radio resource control (RRC) connected state, RRC signaling sent by the network-side device;

receiving, when the first terminal is in an idle state or an inactive state, a system information block (SIB) message sent by the network-side device; or obtaining pre-configuration information when the first terminal is in an offline state, wherein the SIB message or the RRC signaling or the pre-configuration information comprises the second aggregation configuration information.

9. The aggregation configuration method according to claim 6, wherein when the first terminal is in an RRC connected state, before receiving the second aggregation configuration information configured by the network-side device, the method further comprises:

reporting configuration assistance information to the network-side device, wherein the configuration assistance information comprises at least one of the following:

terminal capability information, wherein the terminal capability information is used for indicating whether the first terminal supports an aggregation operation of the SL and a WLAN;

service information that an SL interface of the first terminal tends to transmit;

measurement information of the SL of the first terminal;

measurement information of the another access technology of the first terminal;

service information that an interface of the another access technology of the first terminal tends to transmit; or a transmission tendency of the first terminal for the SL interface and the interface of the another access technology.

10. The aggregation configuration method according to claim 1, further comprising:

mapping a QoS flow of the first terminal to the configured first bearer;

mapping the first bearer to a packet data convergence protocol (PDCP) entity, to form a PDCP protocol data unit (PDU); and encapsulating the PDCP PDU, and transmitting, after adding new header information, the PDCP PDU to the interface of the another access technology for transmission, wherein the header information carries an identifier of the first bearer.

11. The aggregation configuration method according to claim 1, further comprising:

mapping a QoS flow of the first terminal to the configured second bearer;

mapping the second bearer to a packet data convergence protocol (PDCP) entity, to form a PDCP protocol data unit (PDU); and encapsulating the PDCP PDU when the PDCP PDU is transmitted to an AP layer, and transmitting, after adding new header information, the PDCP PDU to the interface of the another access technology for transmission, wherein the header information carries an identifier of the second bearer.

12. The aggregation configuration method according to claim 10, wherein data to which the new header information is added corresponds to a specific identifier of the another access technology, and the specific identifier is used for indicating that the data is data related to aggregation.

13. A terminal, wherein the terminal is a first terminal, comprising:

a memory storing a computer program; and a processor coupled to the memory and configured to execute the computer program to perform operations comprising:

sending first aggregation configuration information to a second terminal, wherein the first aggregation configuration information is used for configuring an aggregation operation aggregating a sidelink (SL) between the first terminal and the second terminal with another access technology, wherein the first aggregation configuration information comprises:

configuration information of a second bearer to which transmission is to be performed through an SL interface and an interface of another access technology; and at least one of the following:

configuration information of a first bearer to which transmission is to be performed through the interface of the another access technology;

information about a quality of service (QoS) flow mapped to the first bearer;

information about a QoS flow mapped to the second bearer;

information about an interface or a port for data transmission using the another access technology;

configuration information of a third bearer to which transmission is to be performed through the SL interface;

information about a QoS flow mapped to the third bearer; or information about a media access control (MAC) address of the another access technology of the first terminal.

14. The terminal according to claim 13, wherein an AP layer at which the SL and the another access technology are aggregated carries a bearer identifier for the first bearer or the second bearer through a data packet transmitted by using the another access technology.

15. The terminal according to claim 13, wherein before sending the first aggregation configuration information to the second terminal, the operations further comprise:

exchanging terminal capability information with the second terminal, wherein the terminal capability information is used for indicating whether the aggregation operation of the SL and the another access technology is supported; and sending the first aggregation configuration information to the second terminal comprises:

sending, when both the first terminal and the second terminal support the aggregation operation of the SL and the another access technology, the first aggregation configuration information to the second terminal.

16. A non-transitory computer-readable storage medium, storing a computer program, wherein the computer program, when executed by a processor of a first terminal, causes the processor to perform operations comprising:

sending first aggregation configuration information to a second terminal, wherein the first aggregation configuration information is used for configuring an aggregation operation aggregating a sidelink (SL) between the first terminal and the second terminal with another access technology, wherein the first aggregation configuration information comprises:

configuration information of a second bearer to which transmission is to be performed through an SL interface and an interface of another access technology; and at least one of the following:

configuration information of a first bearer to which transmission is to be performed through the interface of the another access technology;

information about a quality of service (QoS) flow mapped to the first bearer;

information about a QoS flow mapped to the second bearer;

information about an interface or a port for data transmission using the another access technology;

configuration information of a third bearer to which transmission is to be performed through the SL interface;

information about a QoS flow mapped to the third bearer; or information about a media access control (MAC) address of the another access technology of the first terminal.

17. The non-transitory computer-readable storage medium according to claim 16, wherein an AP layer at which the SL and the another access technology are aggregated carries a bearer identifier for the first bearer or the second bearer through a data packet transmitted by using the another access technology.

\* \* \* \* \*